United States Patent [19]
Bossen et al.

[11] Patent Number: 5,521,709
[45] Date of Patent: May 28, 1996

[54] CONTINUOUS BARCODE MARKING SYSTEM

[75] Inventors: Douglas C. Bossen, Poughkeepsie; Chin-Long Chen, Fishkill; Fuad E. Doany, Katonah; Mu-Yue Hsiao, Poughkeepsie; Ricky A. Rand, Somers; Ralf J. Terbruggen, Yorktown Heights, all of N.Y.

[73] Assignee: International Business Machines Corporation, Armonk, N.Y.

[21] Appl. No.: 57,357

[22] Filed: May 5, 1993

[51] Int. Cl.[6] .............................. H04N 1/23; G01D 9/00; B41J 25/24; G06K 7/10
[52] U.S. Cl. ........................ 358/296; 346/23; 400/253; 235/462
[58] Field of Search .................... 358/296, 297, 358/299; 346/23, 62; 347/107, 139, 248, 262, 264; 235/462, 463, 466; 364/237.85; 382/100, 145; 400/253

[56] References Cited

U.S. PATENT DOCUMENTS

| | | | |
|---|---|---|---|
| 2,351,548 | 6/1944 | Schwartz et al. | 346/62 |
| 2,655,425 | 10/1953 | Wood | 346/23 |
| 3,731,064 | 5/1973 | Berler et al. | 235/61.11 E |
| 3,821,747 | 6/1974 | Mason | 346/62 |
| 4,833,306 | 5/1989 | Milbrett | 235/462 X |
| 4,835,544 | 5/1989 | Winterburn | 347/107 |
| 4,875,174 | 10/1989 | Olodort et al. | 347/107 |

FOREIGN PATENT DOCUMENTS

| | | |
|---|---|---|
| 0463930 | 1/1992 | European Pat. Off. . |
| 0538044 | 4/1993 | European Pat. Off. . |
| 4126626 | 2/1992 | Germany . |
| 8810475 | 12/1988 | WIPO . |

*Primary Examiner*—Peter S. Wong
*Assistant Examiner*—Eric Frahm
*Attorney, Agent, or Firm*—Lawrence D. Cutter

[57] ABSTRACT

A method and apparatus is provided for producing single width barcodes in a continuous, serpentine pattern. This pattern provides continuity of operation for laser marking instruments and thereby results in the formation of more uniform and higher quality barcode indicia. The use of a continuous serpentine pattern also increases the speed at which the code may be written onto a substrate. This marking method is particularly appropriate for use in marking a wide variety of materials including semiconductors, metals, plastics and ceramics.

12 Claims, 3 Drawing Sheets

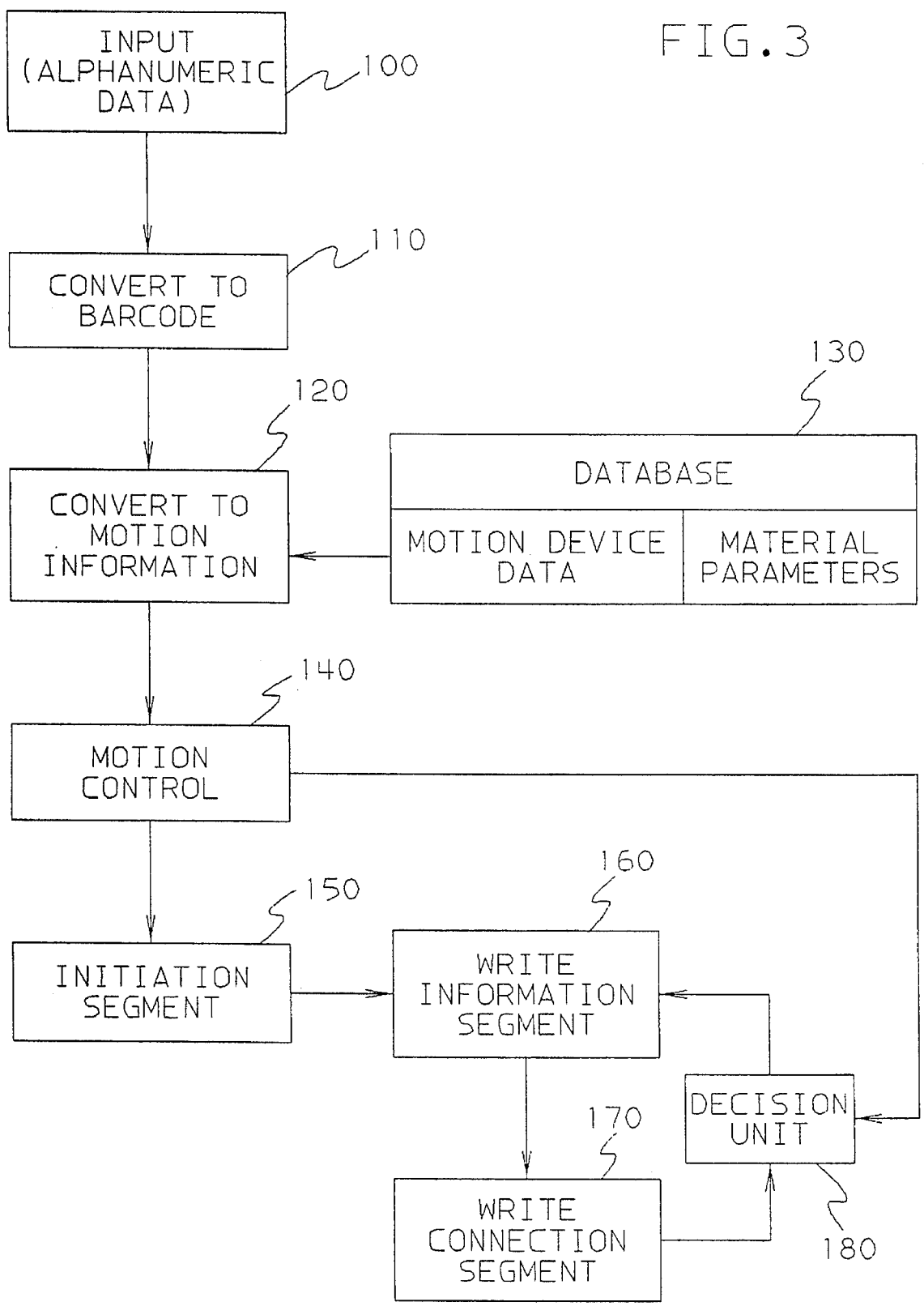

CONTINUOUS BARCODE MARKING SYSTEM

BACKGROUND OF THE INVENTION

The present invention is generally directed to marking substrates with barcode indicia which are readily capable of being read by machine with a very low error rate especially when compared to optical character recognition systems. More particularly, the present invention is directed to a method for marking barcodes in a continuous fashion as a means for providing uniformity in line width and use on a variety of substrate materials. Even more particularly, the present invention is directed to the writing of single width barcodes on various materials using laser radiation so as to produce serpentine or boustrophedonic patterns which enhance both writing and reading barcode characteristics.

The present invention has grown out of work in the marking of semiconductor wafers with a single width barcode which is suitable for the materials and the processes involved in wafer processing and manufacture to produce electronic circuit chip devices. In particular, it has been found that writing multiple width barcode indicia on semiconductor materials using a laser is very difficult. Multiple width barcodes possesss solid lines which are both wide and narrow, and because of the nature of the semiconductor material, lines which are disposed adjacent to one another to produce or effectuate multiple width bar code patterns tend to be very difficult to read and correspondingly also very difficult to write in a fashion which renders them sufficiently well adapted to be read.

Accordingly, especially when writing on semiconductor materials and especially when employing laser energy to produce the markings, both of which are very desirable, it has been found that it is necessary to use single width barcodes as opposed to multiple width barcodes which is perhaps best exemplified by the UPC (Universal Product Code) barcode system.

Additionally, in order to process as many wafers or other forms of substrates through a marking system as quickly as possible, it is desirable to be able to operate in a continuous mode. However, certain materials require higher laser powers or longer laser exposure times to initiate the writing process but which nonetheless can sustain the writing process at a lower power or shorter exposure. For example, various colors of plastics have substantially different requirements for starting laser power depending upon the material's reflectivity. However, once marking starts at a given position the reflectivity decreases and/or the absorption increases so that the writing can be continued more uniformly at a lower power using a continuous wave (CW) beam or by using overlapping spots in a pulsed mode (quasi-continuous) operation. This reflectivity decrease or absorption increase is due to laser processing of the material. In the case of metals, molten metal typically has a lower reflectivity or higher absorption during lasing operations, thus allowing continuous writing at a lower power once melting has been initiated at a high power. For these materials, the continuous nature of the laser marking process is advantageous.

Thus, it is seen that if one wishes to mark a substrate, particularly a semiconductor wafer, with a single width barcode it has been the practice to turn the laser or other marking device on and off repetitively between the marking operations for each individual bar. Naturally, it is the spacing between bars of a single width code which carries the information content of the barcode itself. However, as is seen above, it is actually undesirable to turn the laser writing operation on and off since marking initiation is difficult and can adversely affect the marks that are written which become much more variable than necessary because of the fact that the laser beam is turned on and off for relatively long periods of time. A whole new initiation sequence and marking action must be initiated. This not only slows down the marking process but results in inferior marks being placed on the substrate. Naturally, such marks are harder to read.

SUMMARY OF THE INVENTION

In accordance with one embodiment of the present invention a method is provided for marking a substrate with a single width barcode by marking the substrate in a serpentine configuration with connecting segments linking information segments at opposite ends of the barcode in an alternating pattern. In a preferred embodiment of the present invention there is further provided an initiation segment which extends outwardly from an end of a bar which is disposed at one end of the barcode pattern. This provides a segment in which the lasing operation is given a chance to have its effect upon the material so that the substrate may be operated upon at a lower energy level during subsequent portions of the writing cycle. The serpentine pattern provides a mechanism whereby the laser may be operated in a continuous fashion at a constant energy output level so as to create highly uniform barcode patterns. Additionally, the serpentine nature of the pattern, together with the continuous operation of the laser or a mechanical writing system further enhances the speed of operation and does not require the laser to be turned off. Furthermore, the resulting pattern is not in any way compromised by the connecting links at the end of the bars.

In a further embodiment of the present invention there is provided an apparatus for marking a substrate with a single width barcode in a continuous fashion. This apparatus includes marking means for producing lines having a substantially uniform width on the substrate together with transport means for moving the substrate in a first direction and in a second independent direction relative to the marking means. Alternatively, means may be provided for scanning an optically focused beam or laser beam across the substrate to be marked in the appropriate directions. Furthermore, there is provided control means which causes the lines to be written in a serpentine fashion. These lines include the selectively spaced parallel barcode information segment lines together with connecting segments which link adjacent information segments at opposite ends of the bars. This is done in an alternating pattern to preserve the continuous nature of the writing process. As used herein, and in the appended claims the term serpentine is used to describe a continuous back-and-forth pattern of substantially parallel curves, arcs or straight lines having a substantially uniform width. The spacing between the pattern lines provides information to a scanning device. In preferred embodiments of the present invention, straight lines are desired for ease of writing and reading. In such cases the pattern is more closely described by the adjective "boustrophedonic", which is etymologically derived from words which suggest the furrowing pattern that a farmer would employ when walking his oxen back and forth to plow a field.

Accordingly, it is an object of the present invention to provide a method and apparatus for writing a barcode in a continuous pattern.

It is also an object of the present invention to provide an apparatus and method for increasing the speed with which a barcode pattern may be written.

It is yet another object of the present invention to produce barcode patterns which exhibit a highly uniform width and which have enhanced reflectivity and/or absorption properties.

It is a still further object of the present invention to enhance the quality of barcode patterns written with laser devices, especially when employed in the marking of semiconductor materials, metals, plastics and ceramics.

It is yet another object of the present invention to provide a method and apparatus for marking plastic materials with barcode labelling indicia.

It is a still further object of the present invention to avoid the problems associated with initiation of the barcode writing process when carried out using laser devices on materials such as metals, ceramics, semiconductors and plastics.

It is also an object of the present invention to avoid barcode marking problems which are caused by turning a laser beam on and off, such as may happen at the ends of barcode marks.

It is yet another object of the present invention to provide a marking system which is applicable to a wide variety of materials including plastics, metals, semiconductors, and ceramics.

It is also an object of the present invention to write single width barcode patterns and to write them in a speedy, continuous, uniform and readable fashion.

Lastly, but not limited hereto, it is an object of the present invention to provide a barcode written in a continuous pattern.

DESCRIPTION OF THE DRAWINGS

The subject matter which is regarded as the invention is particularly pointed out and distinctly claimed in the concluding portion of the specification. The invention, however, both as to organization and method of practice, together with the further objects and advantages thereof, may best be understood by reference to the following description taken in connection with the accompanying drawings in which:

FIG. 3 is a flowchart illustrating various steps employed in the control of the marking apparatus which is preferably used to produce the desired serpentine barcode patterns.

DETAILED DESCRIPTION OF THE INVENTION

Figure 1A:
FIG. 1A illustrates a single width barcode pattern such as the BC412 code which may be employed in the present invention.

FIG. 1A illustrates an example of a single width barcode pattern. In particular, the barcode shown is the BC412 code for the character sequence called "AJQ4567". The "412" designation means that each character is represented by 12 barcode modules, 4 of which are occupied by single width bars. Additionally, for the barcode shown there is an additional bar present (a stop bar) to provide an ending signal.

Another barcode that could be illustrated is the so-called BC309 code in which each character is represented by 9 barcode modules 3 of which include single width bar marks. The BC309 barcode is particularly useful for representing information which is solely numeric, as opposed to being alpha numeric in nature.

The single width barcode shown in FIG. 1A has been successfully employed in the marking of semiconductor wafers. In particular, single width barcode indicia have been found to be writable on semiconductor materials using laser devices. However, it is nonetheless desirable to improve the speed at which the laser writing takes place. Nonetheless, because of the nature of the writing process, it has been found that it is not sufficiently satisfactory to simply scan the laser across the wafer substrate in one direction and then to turn the laser off, move it, turn it back on and then to scan it back in the other direction in order to provide single width bars in appropriately spaced relationship to produce the necessary coded information. Turning the laser off results in a poorer quality mark.

Figure 1B:
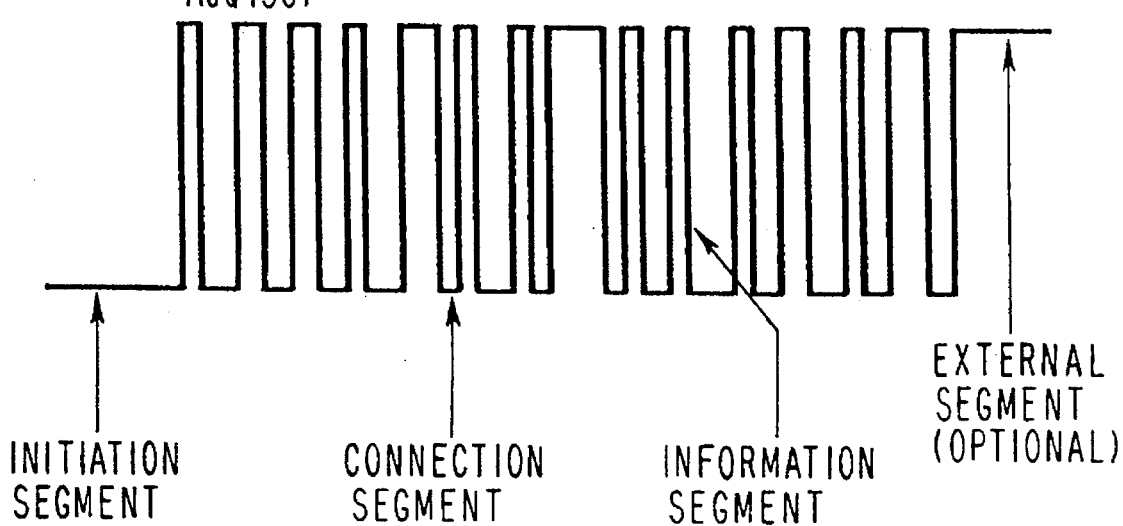
FIG. 1B illustrates a single width barcode constructed in a serpentine fashion in accordance with a preferred embodiment of the present invention.

Accordingly, by providing the barcode information in a continuous pattern such as that shown in FIG. 1B, the above described problems associated with laser marking are alleviated.

For the barcode shown in FIG. 1B, it is assumed that the barcode is written from left to right. It is further seen that the barcode itself includes four different elements. In particular, the information segment elements are the same elements that are present in the barcode shown in FIG. 1A. However, in accordance with the present invention there is also provided a series of connection segments which link adjacent barcode information segments. These connection segments are disposed at the end of the information segments and preferably connect them in a perpendicular fashion. However, the connection segment may actually comprise an arc curve or other form of pattern which is consistent with continuous laser operation. In order to provide continuity in the writing path, the connection segments are disposed in an alternating fashion so as to create a serpentine pattern. Certainly while desirable, it is noted that the initiation segment is not required to be perpendicular to the first barcode information segment.

Additionally, in order for proper initiation of the laser action upon the substrate, particularly if the substrate is a plastic or a metal, an initiation segment is provided which preferably extends perpendicularly outwardly from one end of the first information segment. This ensures that the lasing action effect on the substrate occurs in a continuous and uniform manner at a power level which is suitable for the material. Additionally, an optional external segment is also shown. The presence of this segment provides a means for turning off the lasing operation at a time when cessation of lasing activities will not impact the quality of the barcode being written, particularly the quality of the last information segment.

Figure 2:
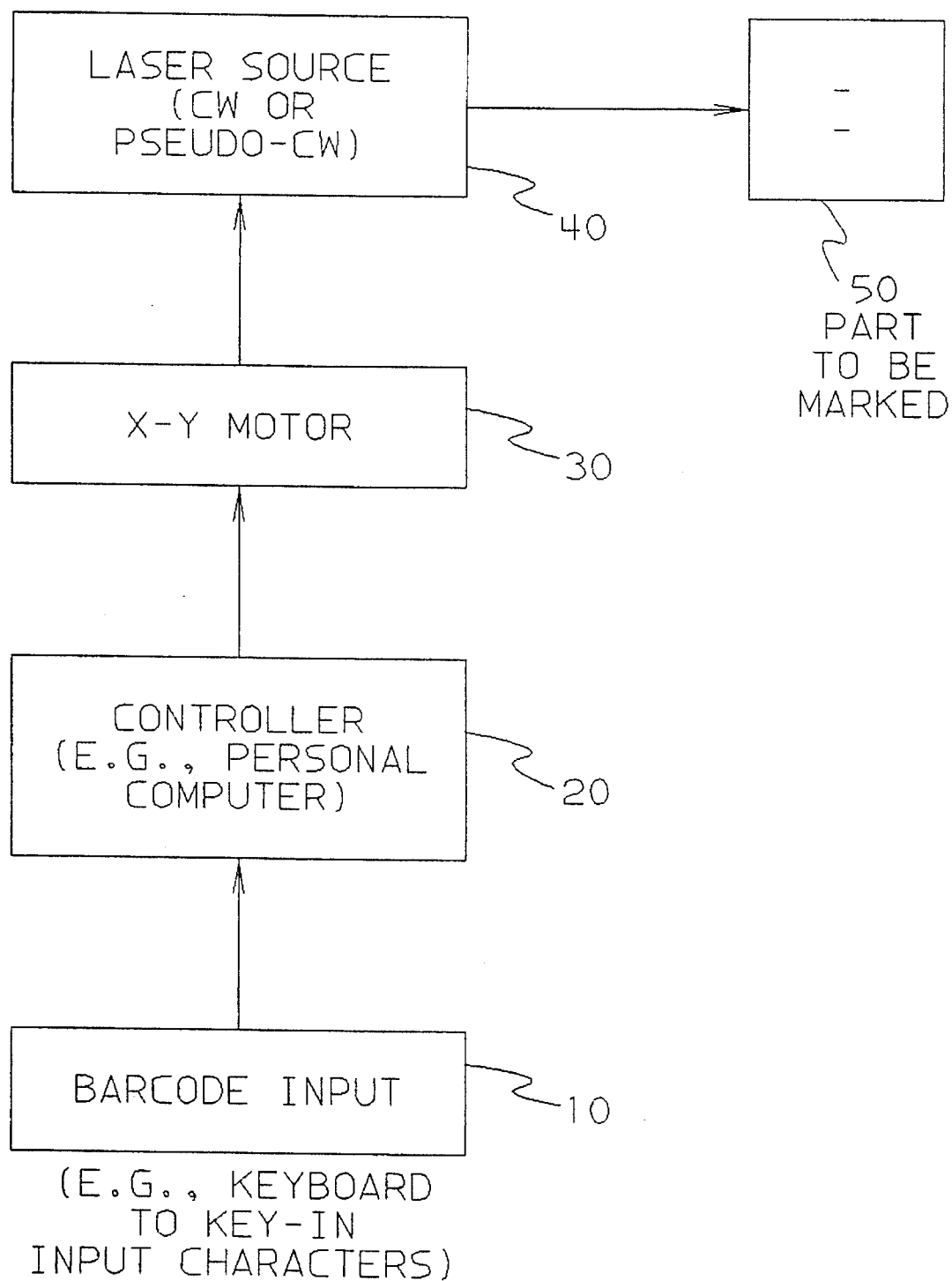
FIG. 2 is a block diagram illustrating the overall design of a marking system in accordance with the present invention.

FIG. 2 illustrates an overall marking system for carrying out the objectives of the present invention. In particular, alpha numeric input data is supplied to an input device such as barcode input keyboard unit 10 which may typically include a computer device which preferentially operates to convert the alpha numeric input information to barcode information in terms of spacing requirement, between adjacent bars. This information is provided, for each desired character, to controller 20 which drives 2-axis motor device 30 which is capable of scanning focused laser source 40 across substrate 50 which is to be marked.

While preferred embodiments of the present invention employ laser energy as a mechanism for marking, other focused energy beam means may be employed. However, in the present invention for the purpose of writing on semiconductor material such as silicon it has been found useful to employ a 0.5 watt continuous wave argon ion laser operating in the visible light range (for example, 514 or 501 nannometers) focused to a spot size of approximately 50 microns in diameter. Using these parameters and moving the part at a velocity of a few millimeters per second, line widths of approximately 200–250 microns were obtained in several different plastic materials.

The X-Y motor 30 can also be used to control continuous wave laser beam steering mirrors in order to mark the substrate. The continuous wave laser is not turned off after writing one bar. The controller, an IBM Personal Computer for example, is used via a program (see FIG. 3) to control motor 30 and laser 40 to write the barcode sequence received from barcode input means 10. Alternatively, the part to be marked can be moved by X-Y motor 30 rather than moving the optical arrangement. The apparatus shown is ideal for marking barcodes that contain only a single width element such as IBM barcode BC412. In this case, a continuous beam is scanned to write the lines and substrate 50 is stepped in the perpendicular direction to the position of the next line without blocking the laser beam. Certain materials may require higher laser powers or longer exposure times to initiate the writing process but can nonetheless sustain the writing process at a lower power or shorter exposure after initiation.

The laser barcode marking may also be done using pseudo-CW (high repetitive pulse rate) or continuous wave (CW) lasers. Laser wave lengths from the deep ultraviolet to far infrared can be used depending upon the absorption characteristics of the materials to be marked. Plastics, metals, semiconductors, polymers and ceramics can all be marked using appropriate laser wave lengths and laser power levels suitable for the material.

A typical laser apparatus comprises the laser beam, steering mirrors and focusing optics. The laser beam may be focused and collimated by convention optics or even by fiberoptics. The laser is focused to the proper spot size to provide the desired line width. The laser-written line width is typically from 1 to 10 times the spot size depending on the laser spot size, laser power, exposure time and the particular material being marked. The part, or the laser spot, or both are then raster scanned to mark the desired pattern in the material. It is noted that X-Y scanning may also be accomplished by moving the part to be marked; it may also be accomplished by moving both the optics and the part.

The type of laser employed may be solid state, gas, dye laser or laser diodes. The marking can also be accomplished in a non-laser fashion using a mechanical router or through the use of ink jets. Additionally, the line may be written by other mechanical means including drilling, routing or water jets. The serpentine barcode may also be written by depositing material including paint and/or ink. Additionally, it is seen that the barcode pattern may be impressed upon the material when it is present in a mold.

In accordance with a preferred embodiment of the present invention, a program flowchart for control of X-Y motor 30 is shown. In particular, as indicated above, alpha numeric data is provided in step 100 and in step 110 it is converted to a barcode information format. Next, this barcode spacing information is further converted to motion information for control of the writing mechanism (step 120). More particularly, it is noted that the computer program effectuating the control aspects of the present invention is also preferably provided with access to database 130 which includes material parameters. Such parameters may be employed to select laser power, barcode module size, laser spot diameter and motion rate. These are typically the parameters that depend upon the specific material being marked. Additionally, database 130 may also include information concerning motion device data including velocity, acceleration, length of bar segment and spacing. This motion information is provided to motion control unit 140. In one test of the present invention, control was effected through a standard PC RS-232 signal line used to communicate with a Linger Scientific Model CC1.2 motion controller. In particular, in motion control step 140 an initiation segment 150 is written as is shown in FIG. 1B after which the first information segment in the barcode is written (step 160) subsequent to which the first connection segment is written (step 170). Subsequently control passes to decision unit 180. Thus in step 180 it is determined whether to write another information segment, and where, in response to motion control information from step 140, or to terminate the operation at the last barcode element and thusly to perhaps also provide the optional external or trailing line segment as described above.

It is further noted that the radiation source used to provide the appropriate line mark may in fact include any appropriate form of electromagnetic radiation, including xrays.

It is noted also, that it is possible to provide direct contact marking in accordance with the present invention. In this approach, an X-Y motor such as 30 drives a pen, scribe, router, drill or other instrument across the surface to be marked in the described serpentine pattern. This is to be contrasted with other embodiments of the present invention in which a prism and/or mirror is used to scan a focused beam of radiation across the substrate.

Accordingly, from the above, it should be seen that the method and apparatus of the present invention provides several significant advantages. In particular it is seen that the stated objectives are met in that the invention provides a continuous, fast and effective means for producing the desired single width barcode. It is not required that the laser beam be turned off at the end of one bar, nor does it require that the laser beam be turned on at the start of the next bar. The continuous operation provides a faster operating speed. Moreover, better marking quality results since the laser energy is now providable in a uniform and continuous fashion and all the bars are marked in a more uniform way. Additionally, there is an energy saving aspect to the present invention in that some of the materials require a greater laser energy to initiate marking at a new spot. By providing an initiation segment it is possible to reduce the power supplied to the laser once a new spot has been started.

While the invention has been described in detail herein in accordance with certain preferred embodiments thereof, many modifications and changes therein may be effected by those skilled in the art. Accordingly, it is intended by the appended claims to cover all such modifications and changes as fall within the true spirit and scope of the invention.

The invention claimed is:

1. A method for marking a substrate with a barcode in which bars thereof exhibit the same width, said method comprising the step of marking said substrate in a serpentine pattern with connecting segments linking ends of said bars at opposite ends thereof in an alternating pattern.

2. The method of claim 1 further including providing an initiation segment extending outwardly from an end of a bar which is disposed at an end of the barcode.

3. The method of claim 1 further including providing a trailing segment extending outwardly from an end of a barcode which is disposed at an end of the barcode.

4. The method of claim 1 in which said marking is carried out with a laser.

5. The method of claim 4 in which said laser is a continuous wave laser.

6. The method of claim 4 in which said laser is a pulsed laser operating sufficiently continuously to provide single line marking.

7. An apparatus for marking a substrate with a barcode in which bars thereof exhibit the same width, said apparatus comprising:

marking means for producing lines having a substantially uniform width on said substrate;

transporting means for moving said substrate in a first direction and independently in a second direction relative to said marking means; and control means to cause said lines to be produced on said substrate in a serpentine pattern which includes selectively spaced parallel lines of information segments together with connecting segments linking said information segments at opposite ends thereof and in an alternating pattern, whereby the substrate may be marked with a barcode in a continuous fashion.

8. The apparatus of claim 7 in which said marking means comprises a laser.

9. The apparatus of claim 7 in which said marking means comprises a mechanical tool.

10. The apparatus of claim 9 in which said tool rotates during marking.

11. The apparatus of claim 7 in which said marking means comprises a printing mechanism.

12. A substrate marked in accordance with the method of claim 1.

* * * * *